United States Patent Office 2,811,201
Patented Oct. 29, 1957

2,811,201

MOVABLE SLOT CLOSURES

James W. Reid, Jr., Collingswood, N. J., assignor to Basil Lermont, New York, N. Y.

Application July 26, 1951, Serial No. 238,758

8 Claims. (Cl. 160—122)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in closures, and more particularly pertains to movable slot closures.

Various devices have been employed in the past to seal a slot in a structure through which a component element protrudes movably. Typical means to accomplish this purpose have included zippers, rigid members sliding in grooves on each side of the slotted element, and flexible sliding members that are rolled up at the ends of the slot by means of a power spring or equivalent device. However, each of these methods has serious disadvantages. Zipper closures must be kept lubricated, are subject to jamming by the entrance of foreign material, and require complex dollies to be employed to open and close the zipper and to pass the zipper cloth over the protruding object. In addition, the fabric forming the zipper cloth requires special treatment for protection against extreme service conditions and it is difficult to make the zipper teeth airtight. Where rigid sliding members are employed, space must be available at each end of the slot to accommodate the full length of the slot closure, and the slot must define a plane surface or a surface of constant radius. Further, the closure element must ride freely in its groves throughout the length of its stroke, and because the entire closure must move at one time, the friction force is high and the entire closure must be broken free at one time if it becomes frozen by foreign material such as ice or dirt or by reason of inadequate lubrication. Where a flexible sliding member is employed, the entire closure moves at one time, introducing the problems of high friction forces and freezing. The groves that guide the flexible sliding member must be held to close tolerances to prevent jamming and air leakage. If the flexible member is flaccid it tends to buckle, while increase in rigidity is accompanied by a corresponding increase in the force required from the power springs. Finally, such power springs are balanced in only one position of the stroke.

All of the foregoing disadvantages are substantially overcome by the subject device, which provides a movable slot closure that affords an effective seal.

The principal object of this invention is to provide a movable slot closure that affords more positive sealing action with the expenditure of less power for operation, the use of less space in installation, and the provision of more facile release from any type of freezing than characterize slot closures heretofore employed.

Another object is to provide a movable slot closure that can be applied over a larger variety of shapes of slots, and longer and wider slots, than slot closures heretofore used.

A further object is to provide a movable slot closure adapted for use on concave as well as convex contours, and adapted to provide an accelerating or decelerating force over any predetermined portion of the closing or opening stroke.

Another object is to provide a movable slot closure that requires no special servicing after installation, and can be jettisoned facilely and quickly.

Still another object is to provide a movable slot closure that will provide a seal around a plurality of relatively movable components that project from a slot, including rotating or reciprocating devices.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
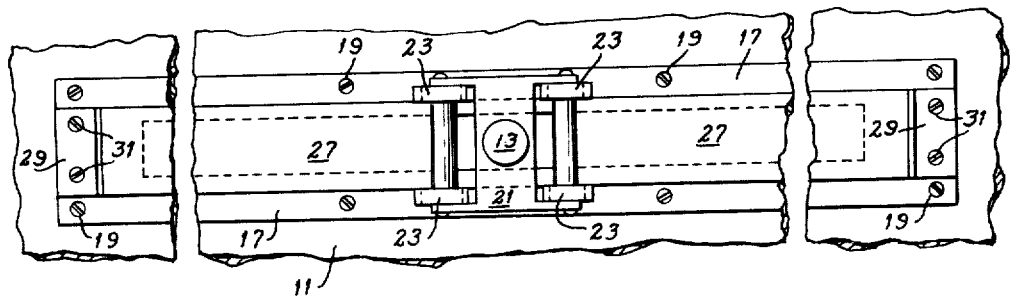
Fig. 1 is a fragmentary plan view, partly broken away, of a movable slot closure mounted upon a device having a slot, showing a preferred embodiment of the invention.
Figure 2:
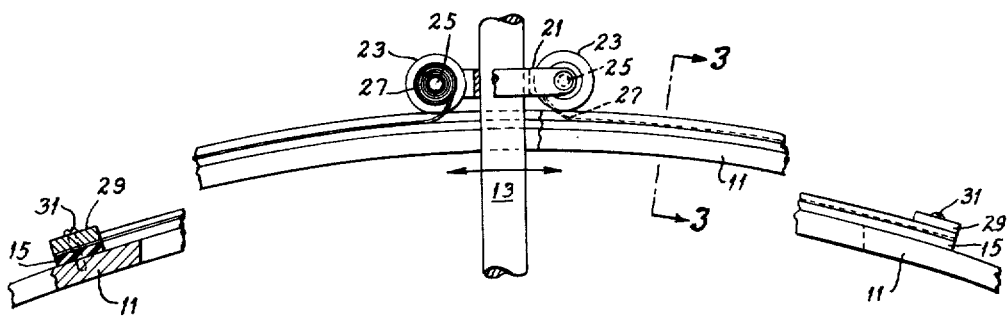
Fig. 2 is an elevation thereof, partly broken away and partly in section.
Figure 3:
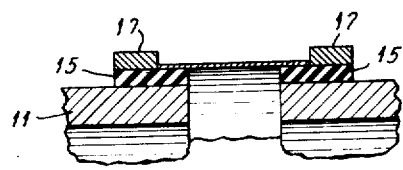
Fig. 3 is an enlarged section taken on the line 3—3 of Fig. 2.

The subject device employs a negative spring, an elastic member having a zero or negative gradient, as a movable slot closure. Such spring is a prestressed coiled component characterized by the following properties:

The negative spring has flat or receding force-deflection characteristics $k$. Where an extension spring under initial tension, or either a compression or extension spring without initial tension, is characterized by a constant and positive $k$, wherein force increases with increase in deflection, the negative spring has a constant or decreasing force with increase in deflection.

Whereas the usual extension spring expands only one-half to two times its original length, the negative spring has enormous expandibility and range of action, its usable deflections being of the order of thirty to fifty times the original dimensions of the unloaded spring. The negative spring can act without losses or inaccuracies around corners and through small openings, with the same freedom as non-elastic bands or cables. It is characterized by high initial force, even up to maximum rating, at initial deflection, and by the ability to store and deliver approximately twice as much energy as a conventional spiral or power spring occupying the same space.

In the negative spring, the elastic characteristic of each increment of length is used sequentially from one end to the other, rather than all at once. The mechanism is a tight coil of flat material that is unwound progressively throughout the range of action. The material is prestressed in manufacture so that it possesses a strong natural curvature, and force must be exerted to straighten it. The device is so highly prestressed throughout its entire length that, when it forms a natural coil, the turns lie tightly upon each other and the resultant coil is solid. The coiling torque, which opposes the uncoiling pull, is developed only by that section of the spring that is being straightened as it is drawn off the tight coil. Thus, the working region of a negative spring at any instant is the arc including the portion of the spring that is partly straightened from the natural radius of curvature.

The distinctions between the negative spring and the normal power and spiral springs are significant. In its normal unrestrained position, the stock of the negative spring forms a solid coil, whereas the stock of the power spring lies out flat or nearly flat and the stock of the spiral spring lies coiled with ample free space between successive layers or turns. If the outer end of either a spiral or power spring is held and a torque applied on the shaft holding the inner end, the spring will wind on the shaft. The negative spring is wound tightly on its shaft because its natural radius of curvature at any point is less than that of the shaft. Thus, if the outer end is held, it can be wound no further. In a power or spiral spring, the entire length of the stock that is not restrained physically by contact with other turns acts like a long bent beam to produce torque, while in the negative spring only that stock in the partly straightened zone produces torque.

It is thus apparent that the coil radius from which any incremental length of the negative spring is uncoiled affects the force it exerts. The limiting case, which is the greatest force, occurs when a section is unwound from its natural radius of curvature. If the spool or drum on which the spring is wound is of larger radius than the natural radius, a fraction of the straightening work already has been done by mechanical restraint, so that less force is required to straighten the spring fully. That is, other factors being equal, the larger the spool the less force the spring exerts.

The basic relationship between the external force applied to a negative spring and its internal reaction is developed by equating the external work done by extension through an incremental length to the energy stored in the system by straightening an equivalent incremental length of natural radius of curvature $R_n$ from a coiled radius $R_1$. A close approximation is $$P = \frac{EI}{2}\left[\frac{1}{R_n^2} - \left(\frac{1}{R_n} - \frac{1}{R_1}\right)^2\right]$$

where $P$ = force applied in pounds
$E$ = modulus of elasticity $I$ = moment of inertia of section of stock = $\frac{bt^3}{12}$, in.$^4$ where $b$ = width of stock in inches
$t$ = thickness of stock in inches
$R_n$ = natural radius of curvature in inches
$R_1$ = radius of mounting spool, shaft or drum in inches If the spring is already flat, $R_1$ equals $\alpha$ and the term in brackets reduces to zero. If the spring is unwound from its own natural radius, $R_1$ equals $R_n$ and the term within the brackets reduces to $$\frac{1}{R_n^2}$$

The calculated force P, based on the above formula, is a few percent greater than the actual extending force measured by test, the difference being caused by the energy consumed when a section of the spring, approaching flatness, snaps into the lateral arch or chamber characterizing the fully straightened lengths.

The subject device utilizes a pair of negative springs to provide a movable slot closure. The device is illustrated in the drawing in a typical application where a structure such as a machine element 11 or a gun turret, for example, having a slot through which an elongated member such as a shaft 13 on a gun barrel protrudes is to be provided with a movable slot closure, the shaft 13 being reciprocable along the length of such slot.

A gasket material 15, such as rubber, is cut to form a peripheral gasket which borders such slot. Strips 17 are carried upon said gasket material 15, said strips 17 being secured to element 11 through gasket material 15 as by screws 19 to retain the gasket material in place and to serve as side guides or guide rails for the springs hereinafter described.

An element movable along the slot hereinafter referred to as a supporting frame or dolly 21 is mounted on shaft 13 external the slot, and includes a plurality of wheels or rollers 23 that ride on strips 17 and a pair of rotatable spring supporting means or bearing members 25.

A negative spring 27 consisting essentially of a self-winding, ribbon-like spirally coiled spring strip has one end fixed to and is wound upon each of said bearing members, the other end of each negative spring being secured to element 11 beyond the end of the slot by a cap plate 29 and screws 31 that pass through said cap plate, said spring, the gasket material, and into element 11. Said negative springs are coiled oppositely upon said bearing member, and preferably have equal and constant pulls throughout their lengths to give a balanced spring force throughout the shaft stroke. The spring supporting means or bearing members 25 are preferably mounted in bearings to reduce to a minimum the force required to move the closure.

As the shaft moves the dolly 21 from one end to the other end of the slot, one of the negative springs 27 rolls up on its bearing member and the other negative spring plays out over the slot between the guide rails 17. As the spring rolls up on its drum, only a small increment of such spring is lifted from the track at a time. As a result, when icing conditions are present, only a small section of the spring need be broken loose from the gasket material at any one time, so that a comparatively small force will be sufficient to effect the desired movement. Reciprocation of the shaft under minimum applied force is also aided by the fact that the spring elements are not dragged along the gasket material, but are lifted up or laid down. It is also apparent that the curving of a spring as its winds will tend to break any foreign material that has adhered to the spring surface into small pieces that can be removed facilely.

Compactness of the device is afforded by reason of the characteristic property of a negative spring of coiling up on itself tightly, and by the use of the spring itself as a sealing element. The positive nature of the seal provided constitutes a marked improvement over seals heretofore employed, the effectiveness of such seal stemming from the inherent characteristics of negative springs: When the spring lies over the gasket and the higher pressure is outside, the spring is pressed more tightly against the gasket material. When the higher pressure is inside, the lifting force must work against the stress pre-set in the spring by the manufacturing process, wherein incremental radii of curvature are impressed throughout the length of the spring. Each increment of the high $P_1$ must work against this force to lift the seal, and each increment of the high $P_1$ must also work against the tension caused by the pull of the spring—a condition analogous to the straightening effect of a tension load on a curved beam.

Alternatively, the negative springs employed can also be stressed laterally, by pre-rolling the spring material around an axis parallel to the length of the spring. Such pre-rolling overcomes the tendency of the spring to curl along its edges. The diameter of this pre-rolling decreases as the spring constant or pull increases, and such pre-rolling increases the pull that can be obtained from the spring when it is rolled up along this axis.

It is apparent that the subject device provides a movable slot closure having numerous advantages over closures heretofore employed. Less power and space are required for operation, while more positive sealing is provided. The closure can be freed more readily from any type of freezing. The device can be used over a much larger variety of shapes, including concave as well as convex contours, and over longer and wider slots. The characteristics of negative springs can be employed to give an accelerating or decelerating force over any portion of the stroke. As the rolled up end of the spring need not be attached to the shaft physically, provision can be made to jettison the closure when required. The slot can be sealed around more than one projection, and even around relatively movable projections. In addition, the closure can be adapted to seal openings in or around rotating or reciprocating devices.

I claim:

1. A closure device for an elongated opening in a structure, comprising a pair of self-winding ribbon-like, spiral springs, means mounting the respective springs on said structure with one end portion of said springs adjacent the respective opposite ends of said opening, means movable along said opening, means mounting the other end portions of said springs on said movable means, one end portion of each spring being in at least a partially coiled condition and being supported by its associated mounting means for free relative rotation so that one of said springs automatically coils and the other spring automatically uncoils as said movable means moves along said opening, whereby the uncoiled portions of said springs and the movable means span the length of the opening from end to end at all times, the coiling tensions of the spring portions in any coiled, uncoiled or partially coiled condition being substantially equal and opposed.

2. A closure device for a slot in a structure, comprising an element movable along the slot, a pair of self-winding spirally coiled ribbon-like springs requiring force exerted at one end portion thereof to uncoil them, means on the element to support the other end portion of said coiled springs for free rotation relative to the element and to each other, and means to secure said one end portion of the respective springs to the structure adjacent to the opposite ends of said slot, said springs being partially uncoiled and covering the slot between its opposite ends and the element, said uncoiled portions of said springs having coiling tensions tending to cause them to coil and exert substantially equal opposing forces upon said element in all positions of said element along said slot, and one of said springs being uncoiled and the other spring being coiled by movement of the element along said slot.

3. A closure device for an elongated opening in a structure, comprising a pair of self-winding ribbon-like springs requiring the application of substantially equal forces to uncoil them, means connecting one end portion of one of the springs to the structure adjacent to one end of the opening, means connecting one end portion of the other spring to the structure adjacent to the opposite end of the opening, an element movable along said opening, and rotatably mounted means on said element connecting the other end portion of the respective springs to said element, said rotatably mounted means supporting the respective springs for free relative rotation to facilitate the coiling of one of said springs and the uncoiling of the other spring as the element moves along said opening to span the opening between its ends and the ends of the movable element at all times, the coiling tensions of said springs being opposed and substantially neutralizing each other in all positions of said element along said opening.

4. A closure for a slot in a gun turret comprising a first normally spirally coiled, substantially constant tension spring having its outer end fixed relative to said turret at one end of said slot, a second normally spirally coiled substantially constant tension spring having its outer end fixed relative to said turret at the other end of said slot, the forces required to uncoil each spring being substantially equal, a supporting frame to receive a gun barrel movable lengthwise of said slot, means on said supporting frame receiving coiled inner end portions of said first and second springs for coiling and uncoiling rotation relative to the supporting frame and each other, one of said springs uncoiling, the other spring coiling as the supporting frame moves along said slot, so that said springs together have uncoiled portions overlying and covering the slot between the supporting frame and the respective ends of the slot at all times.

5. The closure set forth in claim 4 in which said slot is located in a wall of a gun turret that is convexly curved and the springs are so disposed relative to the surface of said turret that they are normally curved, when coiled, in a direction opposite from the curvature of the turret, said uncoiled portions of said springs being bent reversely from their normal curvature when in engagement with said turret to retain the uncoiled portions of said springs tightly against the wall of a turret.

6. A closure for an elongated slot through a machine element, comprising a supporting frame movable along said slot carrying a pair of independently rotatable bearing members, a first negative spring coiled on one of said bearing members and having an end secured to said element beyond one end of said slot, and a second negative spring coiled oppositely on the other of said bearing members and having an end secured to said element beyond the other end of said slot, the opposed coiling tensions of the said springs being substantially constant and equal, whereby the forces exerted by said springs neutralize each other in all positions of said supporting frame along said slot.

7. A closure for an elongated slot through a machine element comprising a supporting frame movable along said slot and carrying a pair of rotatable bearing members, a first negative spring coiled on one of said bearing members and having an end secured to said element beyond one end of said slot, and a second negative spring coiled oppositely on the other of said bearing members and having an end secured to said element beyond the other end of said slot, the forces required to uncoil each spring being substantially constant and equal, and means to move said supporting frame along the length of said slot by the application of a substantially constant force in either direction.

8. A closure for an elongated slot through a machine element having an elongated member extending through such slot and reciprocable therein, comprising a gasket secured to said element and bordering said slot, a pair of guide rails secured on said gasket along the sides of such slot, a supporting frame having a plurality of rollers adapted to ride on said guide rails and having a pair of rotatable bearing members, said supporting frame being carried by said elongated member, a first negative spring coiled on one of said bearing members and having an end secured to said element beyond one end of said slot, and a second negative spring coiled oppositely on the other of said bearing members and having an end secured to said element beyond the other end of said slot, said springs being pre-rolled transversely along their entire length before coiling for tight engagement with said gasket, the uncoiled portions of said springs lying on said gasket between said guide rails, said uncoiled portions of said springs having coiling tensions tending to cause them to coil and exert substantially equal opposing forces on said supporting frame in all positions of said supporting frame along said slot.

References Cited in the file of this patent

UNITED STATES PATENTS

| | | |
|---|---|---|
| 1,458,617 | De Smidt | June 12, 1923 |
| 2,304,990 | Ewing | Dec. 15, 1942 |
| 2,423,636 | Boyd | July 8, 1947 |
| 2,601,361 | Blatz | June 24, 1952 |

OTHER REFERENCES

The Negative Spring—A Basic New Elastic Member, pp. 136–140, Cook and Clarke; Prod. Eng., July 1949.

UNITED STATES PATENT OFFICE

CERTIFICATE OF CORRECTION

Patent No. 2,811,201                                                  October 29, 1957

James W. Reid, Jr.

It is hereby certified that error appears in the printed specification of the above numbered patent requiring correction and that the said Letters Patent should read as corrected below.

Column 1, lines 41 and 49, for "groves" read --grooves--; column 3, line 54, for "chamber" read --camber--; line 61, for "on a gun barrel" read --or a gun barrel--; column 4, line 9, for "member," read --members,--.

Signed and sealed this 14th day of January 1958.

(SEAL)
Attest:
KARL H. AXLINE

Attesting Officer

ROBERT C. WATSON
Commissioner of Patents